(12) United States Patent
Miao (10) Patent No.: US 7,133,646 B1
(45) Date of Patent: Nov. 7, 2006

(54) MULTIMODE AND MULTIBAND MIMO TRANSCEIVER OF W-CDMA, WLAN AND UWB COMMUNICATIONS

(76) Inventor: George J. Miao, 2 Inverness Dr., Marlboro, NJ (US) 07746

( * ) Notice: Subject to any disclaimer, the term of this patent is extended or adjusted under 35 U.S.C. 154(b) by 456 days.

(21) Appl. No.: 10/748,783

(22) Filed: Dec. 29, 2003

(51) Int. Cl.
H04B 1/38 (2006.01)
H04M 1/00 (2006.01)

(52) U.S. Cl. .................. 455/73; 455/552.1; 455/561

(58) Field of Classification Search .............. 455/73, 455/101, 102, 272, 552.1, 84, 561, 562.1, 455/121; 370/276–278, 334, 342; 375/267, 375/299
See application file for complete search history.

(56) References Cited

U.S. PATENT DOCUMENTS

| | | | |
|---|---|---|---|
| 6,728,517 B1 * | 4/2004 | Sugar et al. ................... 455/73 |
| 6,862,271 B1 * | 3/2005 | Medvedev et al. .......... 370/329 |
| 7,020,110 B1 * | 3/2006 | Walton et al. ............... 370/334 |
| 2003/0128658 A1 * | 7/2003 | Walton et al. ............... 370/208 |
| 2003/0161282 A1 * | 8/2003 | Medvedev et al. .......... 370/329 |
| 2003/0162519 A1 * | 8/2003 | Smith et al. ............. 455/277.1 |
| 2003/0235147 A1 * | 12/2003 | Walton et al. ............... 370/204 |
| 2004/0189410 A1 * | 9/2004 | Franca-Neto .......... 331/107 SL |
| 2005/0053170 A1 * | 3/2005 | Catreux et al. ............. 375/267 |
| 2005/0075081 A1 * | 4/2005 | Catreux-Erceg et al. ...... 455/78 |
| 2005/0201478 A1 * | 9/2005 | Claussen et al. ............ 375/261 |
| 2006/0099925 A1 * | 5/2006 | Tsai et al. .................... 455/272 |

* cited by examiner

Primary Examiner—Sonny Trinh (57) ABSTRACT

A multimode and multiband MIMO transceiver of W-CDMA, WLAN and UWB communication is disclosed. The transceiver uses four antennas at the transmitter and the receiver. The W-CDMA has a multicarrier for 12 channels with a total of 15 MHz frequency bandwidth and is able to transmit a data rate more than 2 Mbps. The WLAN can transmit and receive the data rate up to 54 Mbps based on OFDM technologies. On the other hand, the UWB communication uses an OFDM-based multicarrier for four-multiband, with each multiband of frequency bandwidth about 512 MHz, and is able to transmit a very high data rate more than 1 Gbps. Thus, the multimode and multiband MIMO transceiver of W-CDMA, WLAN and UWB communication is enable a user to perform multiple tasks in a real-time operation. This multimode and multiband MIMO-based transceiver utilizes a trade-off benefit of W-CDMA, WLAN and UWB communications, thereby having a co-existence of multi-standard for applications in a wireless and fixed wireless communication environment.

19 Claims, 10 Drawing Sheets

MULTIMODE AND MULTIBAND MIMO TRANSCEIVER OF W-CDMA, WLAN AND UWB COMMUNICATIONS

BACKGROUND

This invention is generally relative to a multimode and multiband Multiple-Input-Multiple-Output (MIMO) transceiver of Wideband Code Division Multiple Access (W-CDMA), Wireless Local Area Network (WLAN), and Ultra Wideband (UWB) Communications for a wireless and fixed wireless communication.

The MIMO is a multiple-input-multiple-output as a wireless link and is also known as a space-time signal processing that a natural dimensional of transmitting data is complemented with a spatial dimension inherent in the use of multiple spatially distributed antennas. The MIMO is able to turn multipath propagations into a benefit for service providers and wireless users. This is because signals on the transmit antennas at one-end and the receiver antennas at the other-end are integrated such that a quality of bit error rate (BER) or a data rate of the communication for each wireless user or a transmitting distance is improved, thereby increasing a communication network's quality of service.

The W-CDMA is a wideband, spread spectrum radio interface that uses CDMA technology to meet the needs for wireless communication systems, which allow subscribers to access World Wide Web or to perform file transfers over packet data connections capable of providing 144 kbps and 384 kbps for mobility, and 2 Mbps in an indoor environment. The W-CDMA (also known as CDMA2000) supports for a wide range of radio frequency (RF) channel bandwidths from 1.25 MHz to 15 MHz with operating of 1.90 GHz band, where the channel sizes of 1, 3, 6, 9, and 15 MHz. The wide channels of the W-CDMA offer any combination of higher data rates, thereby increasing total capacity and/or increasing range. The W-CDMA also employs a single carrier and a multicarrier system, which can be deployed as an overlay over one or more existing the second generation of TIA/EIA-95B 1.25 MHz channels. In the multicarrier system, modulation symbols are de-multiplexed onto N separate 1.25 MHz carrier, where each carrier is spread with a 1.2288 mega-chip per second (Mcps).

The WLAN is an IEEE standard for a wireless LAN medium access control (MAC) and physical layer (PHY) specification and is also referred to as the high-speed physical layer (802.11a) in the 5 GHz band. The WLAN standard specifies a PHY entity for an orthogonal frequency division multiplexing (OFDM) system. The RF lower noise amplifier (LAN) communication system is initially aimed for the lower band of the 5.15–5.35 GHz and the upper band of the 5.725–5.825 GHz unlicensed national information structure (U-NII) bands, as regulated in the United States by the code of Federal Regulations under Title 47 and Section 15.407. The WLAN communication system provides the data payload rate of 6, 9, 12, 18, 24, 36, 48 and 54 mega-bit per second (Mbps). Also, the WLAN communication system supports the transmitting and receiving at data rate of 6, 12, and 24 Mbps with mandatory. The WLAN communication system uses 52 subcarriers with modulation of using binary phase shift keying (BPSK) or quadrature phase shift keying (QPSK), 16-quadrature amplitude modulation (QAM), or 64-QAM. The forward error correction (FEC) coding of a convolution encoder is used to perform a coding rate of ½, ⅔, or ¾.

U.S. Federal Communications Commission (FCC) released a revision of Part 15 of Commission's rules with regard to UWB communications to permit the marketing and operation of certain types of new products on Apr. 22, 2002. UWB communication systems can operate using spectrum occupied by existing radio service without causing interference, thereby permitting scare spectrum resources to be used more efficiently. The UWB communication systems can offer significant benefits for Government, public safety, businesses and consumers under an unlicensed basis of operation spectrum.

FCC is adapting unwanted emission limits for the UWB communication devices that are significantly more stringent than those imposed on other Part 15 devices. For the indoor UWB operation, FCC provides a wide variety of UWB communication devices, such as high-speed home and business networking devices under the Part 15 of the Commission's rules subject to certain frequency and power limitations. However, the UWB communication devices must operate in the frequency band ranges from 3.1 GHz to 10.6 GHz, and have an emission of −10 dBm for the UWB operation. In addition, the UWB communication devices should also satisfy the Part 15.209 limit for the frequency band below 960 MHz. Table 1 lists the FCC restriction of the emission masks (dBm) along with the frequencies (GHz) for the UWB communication devices in the indoor environment.

TABLE 1

| Frequency (MHz) | EIRP (dBm) |
| --- | --- |
| 0–960 | −41.3 |
| 960–1610 | −75.3 |
| 1610–1990 | −53.3 |
| 1990–3100 | −51.3 |
| 3100–10600 | −41.3 |
| Above 10600 | −51.3 |

The UWB communication devices are defined as any devices where the fractional bandwidth is greater than 0.25 based on the formula as follows:

$$FB = 2\left(\frac{f_H - f_L}{f_H + f_L}\right), \quad (1)$$

where $f_H$ is the upper frequency of −10 dBm emission points, and $f_L$ is the lower frequency of −10 dBm emission points. A center transmission frequency $F_c$ of the UWB communication devices is defined as the average of the upper and lower −10 dBm points as follows:

$$F_C = \frac{f_H - f_L}{2}. \quad (2)$$

Furthermore, a minimum frequency bandwidth of 500 MHz must be used for the indoor UWB communication devices regardless of center frequencies.

The UWB communication products can be used for fixed wireless communications within a short-distance range, particularly for a very high-speed data transmission suitable for broadband access to networks in the indoor environment.

The multimode and multiband MIMO transceiver of a W-CDMA, WLAN and UWB communication system is disclosed herein according to some embodiments of the present invention. The invented transceiver system is a MIMO-based multimode and multiband portable station of integrating W-CDMA, WLAN, and UWB communications. The portable station employs four antennas at the transmitter and receiver as a MIMO link. During the wireless communications, the W-CDMA in the portable station has a multicarrier for 12 channels with a total of 15-MHz frequency bandwidth at the center of 1.9 GHz frequency band and is able to transmit the data rate more than 2 Mbps. The W-CDMA can be used as a user phone with enable of communicating speech, data, image, and clip video. On the other hand, during the fixed wireless communications, the WLAN in the portable station can transmit and receive the data rate up to 54 Mbps based on an OFDM technology at the unlicensed national information structure (U-NII) bands of the 5.15–5.35 GHz and the upper band of the 5.725–5.825 GHz. The UWB communication in the portable station uses an OFDM-based multicarrier for four-multiband with each multiband of frequency bandwidth about 512 MHz in the frequency range from 3.1 GHz to 5.15 GHz and is able to transmit the data rate at 1.5 Gbps. Since the UWB communication can transmit and receive a very-high data rate but with a very short-distance range while the WLAN is able to transmit and receive the lower data rate in a much longer distance range than the UWB communication. Thus, a combination of W-CDMA, WLAN, and UWB communications in a specific portable device is enable a user to have internet surf, to listen MP3 music, to watch DVD, to play video game, to view stock graph, to transmit data with other devices in a real-time operation. Therefore, a trade-off benefit of W-CDMA, WLAN, and UWB communications can be utilized each other, thereby having a co-existence of the multimode and multiband portable station with multiply applications in a multiply environment.

The present invention of the multimode and multiband MIMO transceiver of W-CDMA, WLAN, and UWB communications utilizes both benefits of a wireless phone and a fixed wireless broadband communication. Such a multimode device not only can transmit the packet data in a form of wireless phone environment but also can use as a very-high speed wireless broadband Internet device to transmit and receive data, image, video, video game, music, and stock graph in a real-time. Therefore, there is a continuing need of the multimode and multiband MIMO transceiver of W-CDMA, WLAN, and UWB communication system for delivering a very-high data rate with flexibility and scalability capabilities in a combination form of wireless and fixed wireless environments.

SUMMARY

In accordance with one aspect, a multimode and multiband MIMO transceiver of W-CDMA, WLAN and UWB communication comprises: (1) the MIMO-based multimode and multiband RF unit including W-CDMA, WLAN and UWB connected to a multiple antenna unit in which includes N antennas, where N is an integer and greater than 1; (2) the MIMO-based multimode and multiband RF unit connected to a WLAN and UWB OFDM processor in which coupled to a sharing memory bank, an interleaver, and a W-CDMA, WLAN, and UWB control processor coupled to a coding processor; (3) the MIMO-based multimode and multiband RF unit connected to a W-CDMA Rake and baseband processor in which coupled to the sharing memory bank, the interleaver, and the W-CDMA, WLAN, and UWB control processor; (4) the MIMO-based multimode and multiband RF unit connected to the sharing memory bank in which coupled to the WLAN and UWB OFDM processor, the W-CDMA Rake and baseband processor, and the W-CDMA, WLAN, and UWB control processor; (5) the MIMO-based multimode and multiband RF unit connected to the W-CDMA, WLAN, and UWB control processor in which coupled to the sharing memory bank, the W-CDMA Rake and baseband processor, the WLAN and UWB OFDM processor, the interleaver and the coding processor; (6) the interleaver coupled to the W-CDMA, WLAN, and UWB control processor, the W-CDMA Rake and baseband processor, the WLAN and UWB OFDM processor, and the coding processor; and (7) the coding processor coupled to the interleaver and the W-CDMA, WLAN, and UWB control processor.

Other aspects are set forth in the accompanying detailed description and claims.

DETAILED DESCRIPTION

Some embodiments described herein are directed to the multimode and multiband MIMO transceiver of W-CDMA, WLAN, and UWB communication for the wireless and fixed wireless communication. Such the multimode and multiband MIMO transceiver system may be implemented in hardware, such as in an Application Specific Integrated Circuits (ASIC), digital signal processor, field programmable gate array (FPGA), software, and/or a combination of hardware and software.

Transceiver System and Architecture

Figure 1:
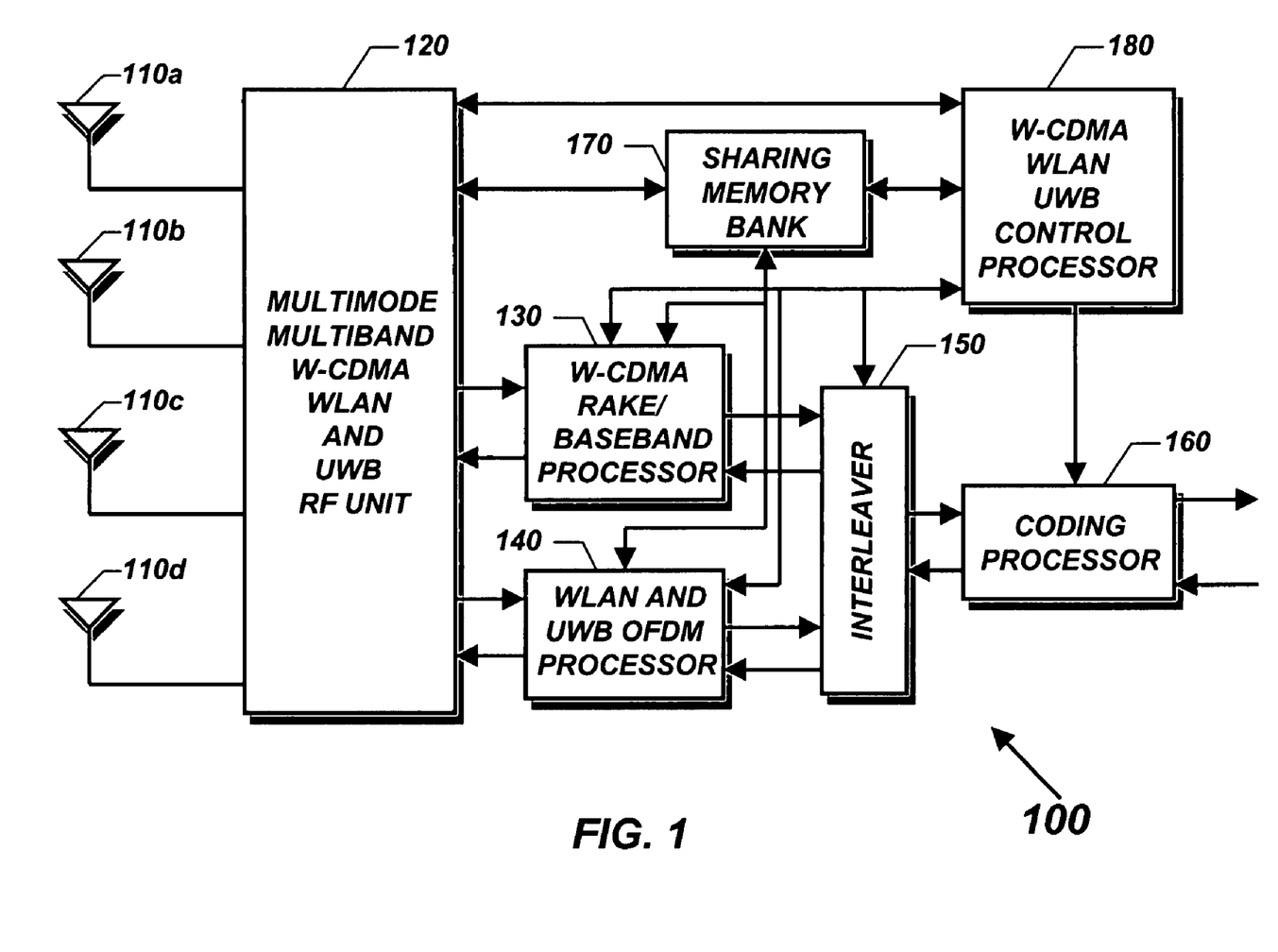
FIG. 1 is a block diagram of showing a multimode and multiband MIMO transceiver of W-CDMA, WLAN and UWB communication according to some embodiments.

Portable station architecture of the multimode and multiband MIMO transceiver of W-CDMA, WLAN, and UWB communication system 100 for the wireless and fixed wireless communication is shown in FIG. 1 in accordance with one embodiment of the present invention. The portable station architecture of the multimode and multiband MIMO transceiver includes a multimode and multiband RF unit of W-CDMA, WLAN, and UWB communication 120, a W-CDMA rake and baseband processor 130, a dual-mode WLAN and UWB OFDM processor 140, an interleaver/deinterleaver unit 150, a coding/decoding processor 160, a sharing memory bank 170, and a tri-mode control processor of W-CDMA, WLAN and UWB 180. The multimode and multiband RF unit of W-CDMA, WLAN, and UWB communication 120, which is coupled to four identical and independent antennas of 110a to 110d, is used to convert baseband signals of W-CDMA, WLAN or UWB into RF signals for a transmitter and/or convert RF signals of W-CDMA, WLAN and UWB into baseband signals for a receiver. During W-CDMA mode, the multimode and multiband RF unit of W-CDMA, WLAN, and UWB communication 120 connects to a W-CDMA rake and baseband processor 130, which deals with a rake processing, a scramble/descramble, and a spreading/dispreading. The W-CDMA rake and baseband processor 130 is coupled to a tri-mode interleaver unit 150 that performs an interleaver and deinterleaver for W-CDMA signals. The tri-mode interleaver unit 150 is connected with a tri-mode coding processor 160 that is used to perform encoding and/or decoding for a user data stream. During a WLAN or UWB mode, the multimode and multiband RF unit of W-CDMA, WLAN, and UWB communication 120 connects to a dual-mode WLAN and UWB OFDM processor 140, which performs a time-domain equalizer (TEQ), an OFDM, a frequency-domain equalizer (FEQ), and/or a multiband spreading/despreading. The dual-mode WLAN and UWB OFDM processor 140 is coupled to the tri-mode interleaver unit 150, which performs an interleaver and deinterleaver for WLAN or UWB signals. The tri-mode interleaver unit 150 is connected with a tri-mode coding processor 160 that is used to perform encoding and/or decoding for a user data stream during WLAN or UWB communications. The control processor 180 of W-CDMA, WLAN and UWB is used to control frame data flows with exchanging between all of the processors of 130, 140, and 160, and units of 120, 150 and the sharing memory bank 170.

The portable station system and architecture 100 of the multimode and multiband MIMO transceiver of W-CDMA, WLAN, and UWB communication is used for the wireless and fixed wireless communication. For the wireless communication, the portable station system and architecture 100 can transmit and receive the W-CDMA data rate stream from 144 kbps to greater than 2 Mbps, and supports for a range of RF channel bandwidths including 1.25 MHz, 3.75 MHz, 7.5 MHz, 11.25 MHz, and 15 MHz at the center frequency of 1.9 GHz. For the fixed wireless communication, the portable station system and architecture 100 can be used either as a WLAN transceiver or as an UWB transceiver. During WLAN mode, the portable station system and architecture 100 can transmit and receive the WLAN data rate up to 54 Mbps at the unlicensed national information structure (U-NII) bands of the 5.15–5.35 GHz and the upper band of the 5.725–5.825 GHz. During UWB mode, the portable station system and architecture 100 is used to transmit and receive the UWB data rate up to 1.5 Gbps based on OFDM-based multicarrier and multiband of frequency bandwidth in the frequency range from 3.1 GHz to 5.15 GHz, with an enhancement of transmitting range due to use of the multiple antennas.

Receiver Architecture

Figure 2:
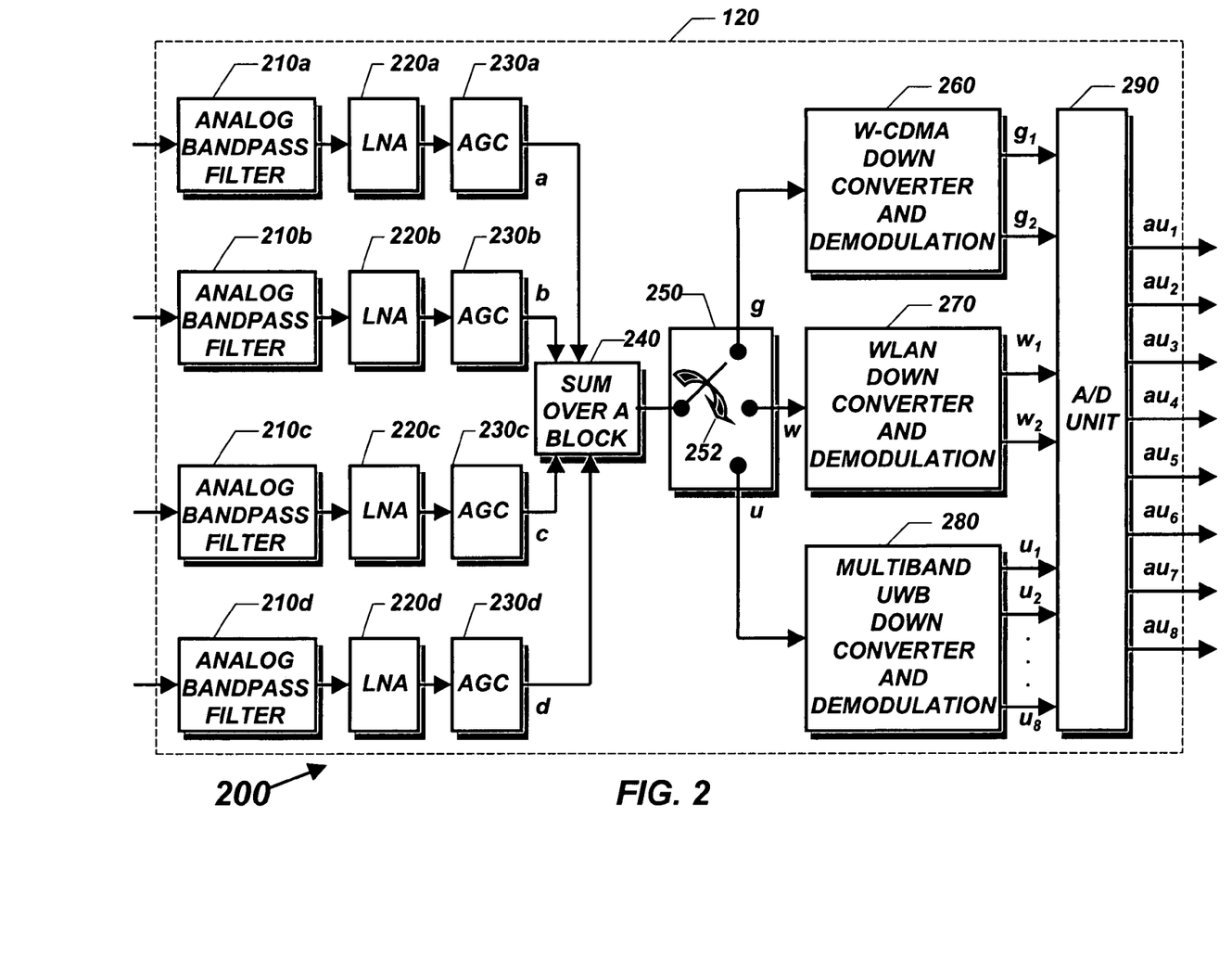
FIG. 2 is a detailed block diagram of showing a multimode and multiband RF receiver section of W-CDMA, WLAN and UWB communication according to some embodiments.

Referring to FIG. 2 is a detailed block diagram 200 of showing the multimode and multiband RF unit of W-CDMA, WLAN, and UWB communication 120 according to some embodiments. Four analog bandpass filters of 210a to 210d connect to four low noise amplifiers (LNA) of 220a to 220d, followed by four automatic gain controls (AGC) of 230a to 230d. Setting parameters of the analog bandpass filters of 210a to 210d, the LNA of 220a to 220d, and the AGC of 230a to 230d is controllable according to one of modes for W-CDMA, WLAN, or UWB communication. The output signals of the AGC of 230a to 230d are then added together by using a sum over a block 240. During W-CDMA mode, the output W-CDMA signals of the sum over a block 240 is connected with a W-CDMA down converter and demodulation 260 by using a selection switch 252 in a switch unit 250. Thus, the W-CDMA down converter and demodulation 260 produces two I and Q baseband analog signals, $g_1$ and $g_2$, for a tri-mode A/D converter unit 290. The tri-mode A/D converter unit 290 produces two digital baseband signals of $au_1$ and $au_2$. During WLAN mode, the output WLAN signals of the sum over the block 240 are connected with a WLAN down converter and demodulation 270 by using the selection switch 252 in the switch unit 250. The WLAN converter and demodulation of 270 produces two I and Q baseband analog signals, $w_1$ and $w_2$, for the tri-mode A/D converter unit 290. The tri-mode A/D converter unit 290 produces two digital baseband signals of $au_1$ and $au_2$. During UWB mode, the output UWB signals of the sum over the block 240 are connected to a multiband UWB down converter and demodulation 280 by using the switch 252 in the switch unit 250. The multiband UWB down converter and demodulation 280 produces eight I and Q baseband analog signals, $u_1, u_2, \ldots, u_8$ for the tri-mode A/D converter unit 290. The tri-mode A/D converter unit 290 produces eight digital baseband signals of $au_1, au_2, \ldots, au_8$.

Figure 3:
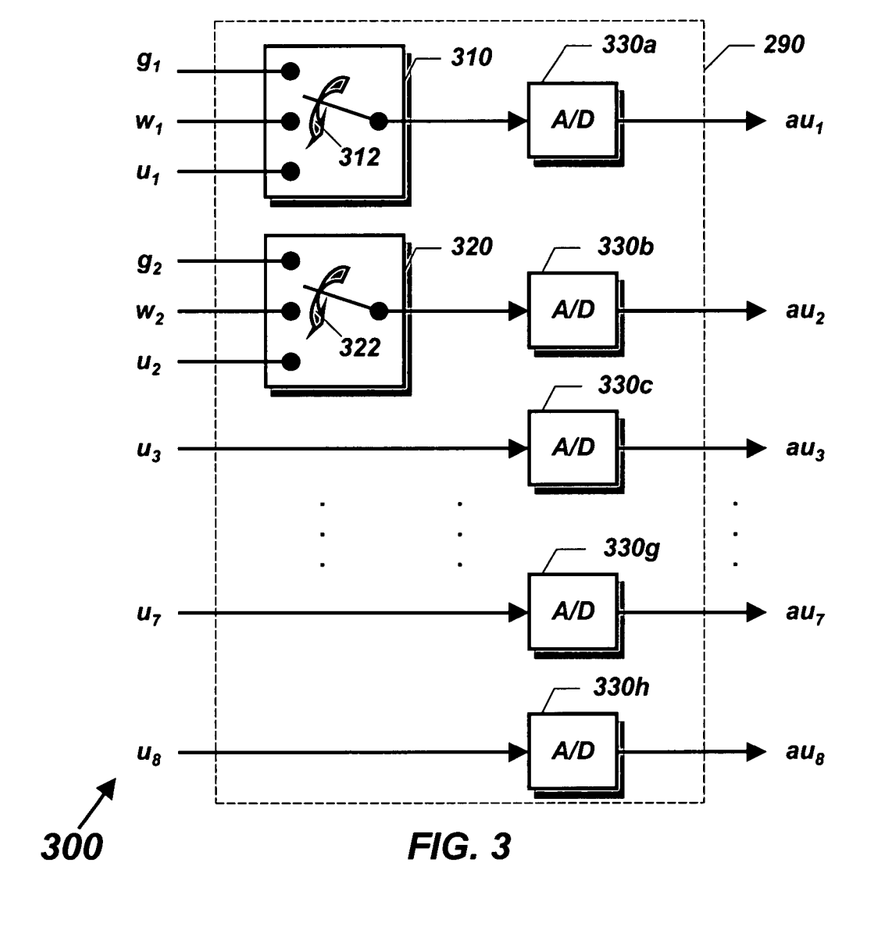
FIG. 3 is a detailed block diagram of showing a tri-mode analog-to-digital (A/D) converter unit according to some embodiments.

Referring to FIG. 3 is a detailed block diagram 300 of showing the tri-mode A/D converter unit 290 according to some embodiments. There are two switch units of 310 and 320 and eight A/D converters of 330a to 330h, with a sampling frequency rate at 540 MHz. During W-CDMA mode, a switch 312 of a switch unit 310 and a switch 322 of a switch unit 320 connect to the input signals of $g_1$ and $g_2$, respectively. The outputs of the switch units of 310 and 320 are passed into two A/D converters of 330a and 330b, with the sampling rate at 540 MHz. This is an over-sampling for the W-CDMA signals. Other A/D converters of 330c to 330h are rest. The output signals $au_1$ and $au_2$ of the A/D converters of 330a and 330b are used for the W-CDMA rake and baseband processor. During the WLAN mode, the switch 312 of the switch unit 310 and the switch 322 of the switch unit 320 connect to the input signals of $w_1$ and $w_2$, respectively. The outputs of the switch units of 310 and 320 are passed into two A/D converters of 330a and 330b, with the sampling rate at 540 MHz. This is an over-sampling for the WLAN signals. Other A/D converters of 330c to 330h are rest. The output signals $au_1$ and $au_2$ of the A/D converters of 330a and 330b are used for the dual-mode WLAN/UWB baseband processor. During UWB mode, the switch 312 of the switch unit 310 and the switch 322 of the switch unit 320 connect to the input signals of $u_1$ and $u_2$, respectively. The outputs of the switch units of 310 and 320 along with other six input signals of $u_3$ to $u_8$ are in parallel passed into eight A/D converters of 330a and 330h, with the sampling rate at 540 MHz. The output signals of $au_1$ to $au_8$ of the A/D converters of 330a to 330h are used for the dual-mode WLAN/UWB baseband processor.

Figure 4:
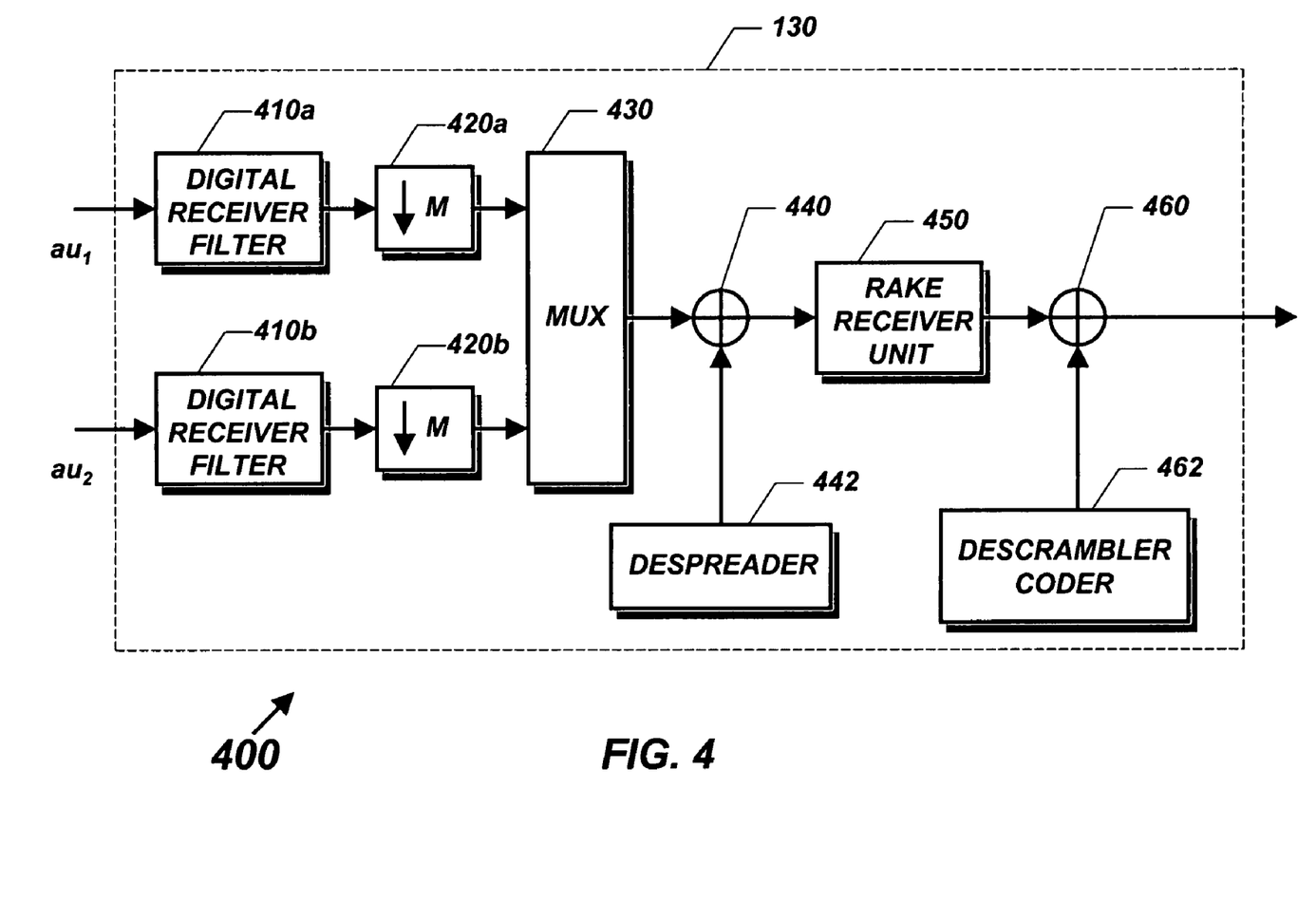
FIG. 4 is a detailed block of showing a W-CDMA rake-based baseband processor according to some embodiments.

Referring to FIG. 4 is a detailed block diagram 400 of showing the W-CDMA rake and baseband processor 130 according to some embodiments. Two input digital signals of $au_1$ and $au_2$ are passed through two digital receiver filters of 410a to 410b, followed by two down-sampling of 420a to 420b. A combination of digital receiver filter 410a and the down-sampling 420a, and a combination of the digital receiver filter 410b and the down sampling 420b are to form two digital decimation filters, respectively. The outputs of the down-sampling of 420a to 420b are multiplexed together by using a MUX 430. The output of the MUX 430 is despread with a sequence from a despreader generator 442. The despread signals of a spreader 440 output are passed through a rake receiver unit 450. Then, the output of the rake receiver unit 450 is descrambled with a sequence of a descrambler coder generator 462 by using a spreader 460. The output of the spreader 460 is used for deinterleaver.

Figure 5:
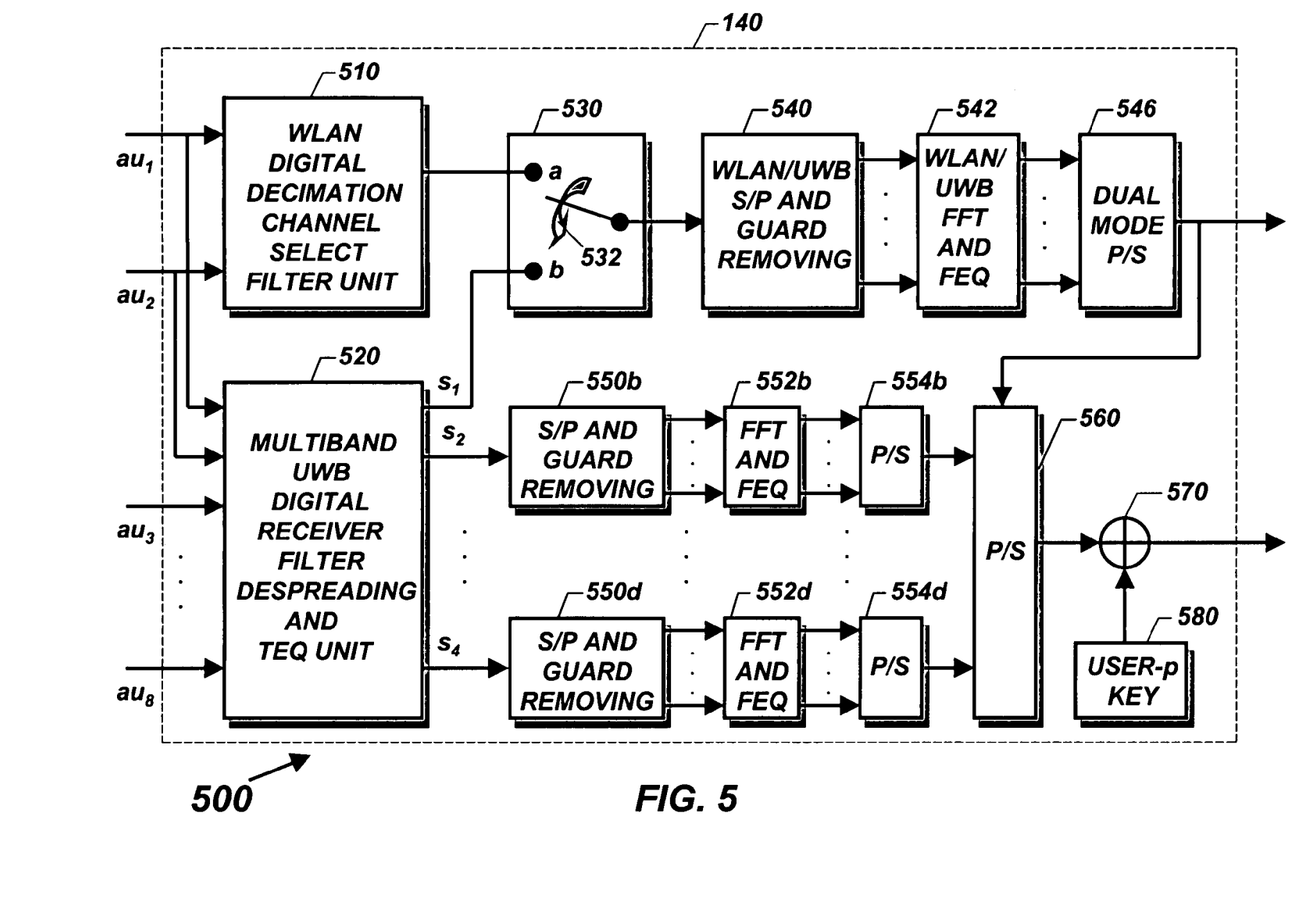
FIG. 5 is a detailed block diagram of showing a dual-mode WLAN and UWB OFDM processor according to some embodiments.

FIG. 5 is a detailed block diagram 500 of showing a dual-mode WLAN and UWB OFDM processor 140 according to some embodiments. During WLAN operation, the input signals of $au_1$ and $au_2$ are passed into a WLAN digital decimation channel select filter unit 510, which produces desired digital downsampled signal sequence. By connecting a switch 532 to a position of "a" in a switch unit 530, the output of the WLAN digital decimation channel select filter unit 510 is passed through a dual-mode WLAN and UWB, serial-to-parallel (S/P) and guard removing unit 540 to produce 64 parallel signals for a dual-mode WLAN and UWB FFT and FEQ unit 542. The WLAN and UWB FFT and FEQ unit 542 performs 64-point FFT and FEQ operation followed by a parallel-to-serial (P/S) unit 546 to convert 64 parallel signals into a serial output signal. On the other hand, during UWB operation, the input signals from $au_1$ to $au_8$ are passed into a multiband UWB digital receiver filter despreading and TEQ unit 520 to produce 4 parallel signals. The first output signal $s_1$ connects to the dual-mode WLAN and UWB S/P and guard-removing unit 540 to produce 1024 parallel signals by connecting the switch 532 into a position "b" in the switch unit 530. Then, the 1024 output signals of the dual-mode WLAN and UWB S/P and guard-removing unit 540 pass through the dual-mode WLAN and UWB FFT and FEQ unit 542 to produce 512 parallel signals for the P/S unit 546, which converts 512 parallel signals into a serial signal for a P/S unit 560. Other output signals of $s_2$ to $s_4$ from the multiband UWB digital receiver filter, despreading and TEQ unit 520 in parallel pass three S/P and guard removing units of 550b to 550d. Each of S/P and guard removing units of 550b to 550d produces 1024 parallel signals for FFT and FEQ units of 552b to 552d followed by P/S units of 554b to 554d to produce a serial signal. Then the P/S unit 560 converts the output signals of the P/S unit 546, and the P/S unit 554b–554d to produce one single output signal in which is despreaded with a sequence from a user key generator 580 by using a spreader 570.

Figure 6:
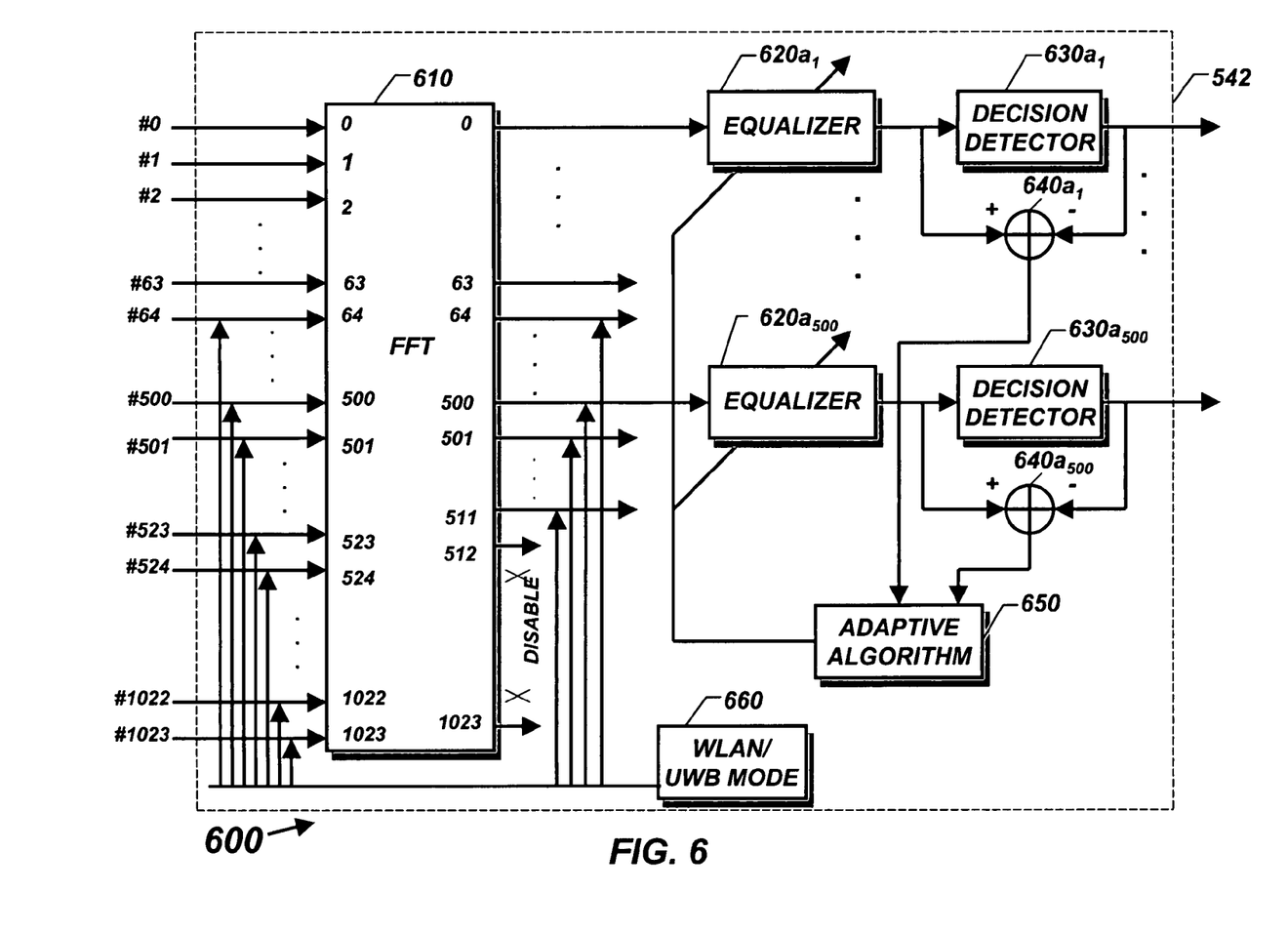
FIG. 6 is a detailed block diagram of showing a dual-mode WLAN and UWB Fast Fourier transform (FFT) and frequency-domain equalizer (FEQ) unit according to some embodiments.

FIG. 6 is a detailed block diagram 600 of showing a dual-mode WLAN and UWB FFT and FEQ unit 542 according to some embodiments. This unit includes a 1024-point FFT 610, a WLAN/UWB mode 660, 500 equalizers $620a_1$ to $620a_{500}$, 500 decision detectors $630a_1$ to $630a_{500}$, 500 subtracts $640a_1$ to $640a_{500}$, and an adaptive algorithm 650. During WLAN mode, the 1024-point FFT 610 only performs 64-point FFT operation under controlling by the WLAN/UWB mode 660. The 64 equalizers $620a_1$ to $620a_{64}$, 64 decision detectors $630a_1$ to $630a_{64}$, and 64 subtracts $640a_1$ to $640a_{64}$ are used along with the adaptive algorithm 650 to update the equalizer taps. Thus, the dual-mode WLAN and UWB FFT and FEQ unit 542 produces 64 parallel output signals. During UWB mode, the 1024-point FFT 610 has 1024 inputs and produces 512 outputs, which are used for 500 equalizers $620a_1$ to $620a_{500}$, 500 decision detectors $630a_1$ to $630a_{500}$, and 500 subtracts $640a_1$ to $640a_{500}$. The adaptive algorithm 650 is used to adjust the equalizer taps. The adaptive algorithm is one type of algorithms including a least mean square (LMS), a recursive least squares (RLS) or a constant modulus algorithm (CMA). As a result, in this case, the dual-mode WLAN and UWB FFT and FEQ unit 542 produces 500 parallel output signals.

Figure 7:
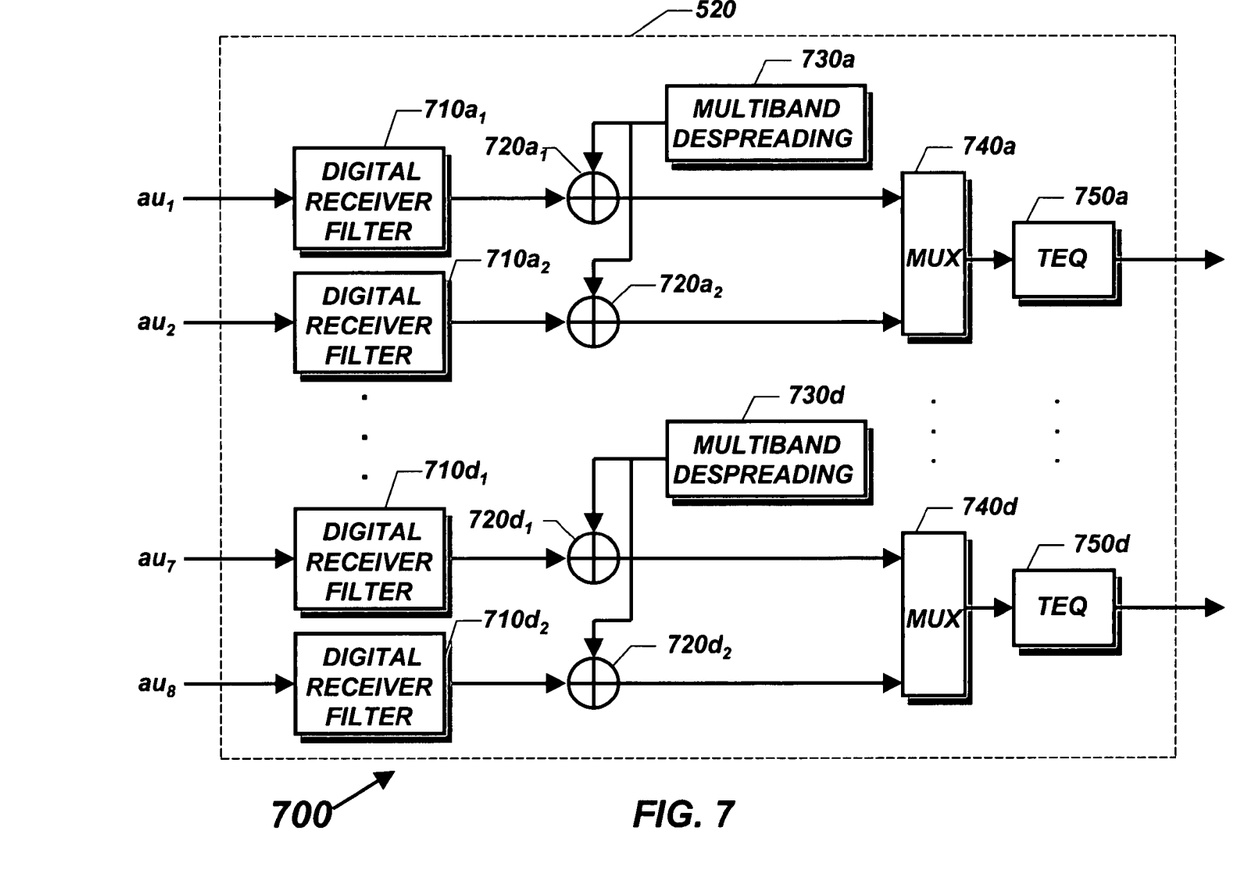
FIG. 7 is a detailed block diagram of showing a multiband UWB digital receiver filter, despreading, and time-domain equalizer (TEQ) unit according to some embodiments.

FIG. 7 is a detailed block diagram 700 of showing the multiband UWB digital receiver filter, despreading and TEQ unit 520 according to some embodiments. The input UWB signals $au_1$ to $au_2$ in parallel pass through eight digital receiver filters $710a_1$ and $710a_2$, to $720d_1$ and $720d_2$. Each of the digital receiver filters $710a_1$ and $710a_2$ to $720d_1$ and $720d_2$ is followed by one of spreading unit $720a_1$ and $720a_2$ to $720d_1$ and $720d_2$ to perform a despreading operation. Each of despreading sequences is generated by each of multiband despreading units 730a to 730d, respectively. Then, the output despreaded signals of the spreading units $720a_1$ and $720a_2$ are multiplexed together by using a MUX 740a, followed by using a time-domain equalizer (TEQ) 750a. In a similar way, the output despreaded signals of the spreading units $720d_1$ and $720d_2$ are multiplexed together by using a MUX 740d, followed by using a TEQ 750d.

Figure 8:
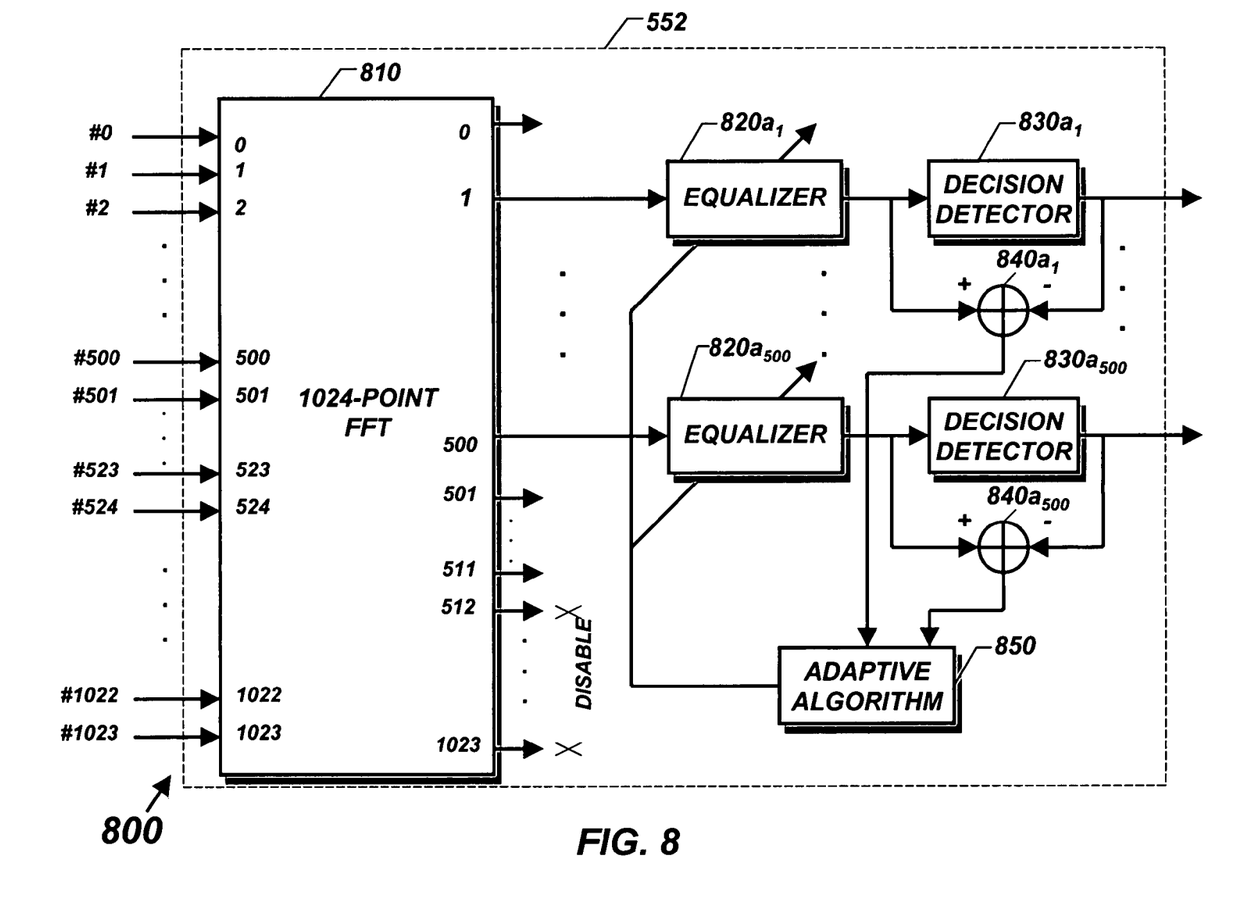
FIG. 8 is a detailed block diagram of showing an UWB FFT and FEQ unit according to some embodiments.

FIG. 8 is a detailed block diagram 800 of showing a FFT and FEQ unit 552 (for 552b to 552d) according to some embodiments. This unit includes a 1024-point FFT 810, 500 equalizers $820a_1$ to $820a_{500}$, 500 decision detectors $830a_1$ to $830a_{500}$, 500 subtracts $840a_1$ to $840a_{500}$, and an adaptive algorithm 850. The 1024-point FFT 810 has 1024 inputs and produces 512 outputs in which are used for 500 equalizers $820a_1$ to $820a_{500}$, 500 decision detectors $830a_1$ to $830a_{500}$, and 500 subtracts $840a_1$ to $840a_{500}$. The adaptive algorithm 850 is used to adjust the equalizer taps. Thus, the FFT and FEQ unit 552 produces 500 parallel output signals for UWB mode.

UWB Output Spectrums

Figure 9:
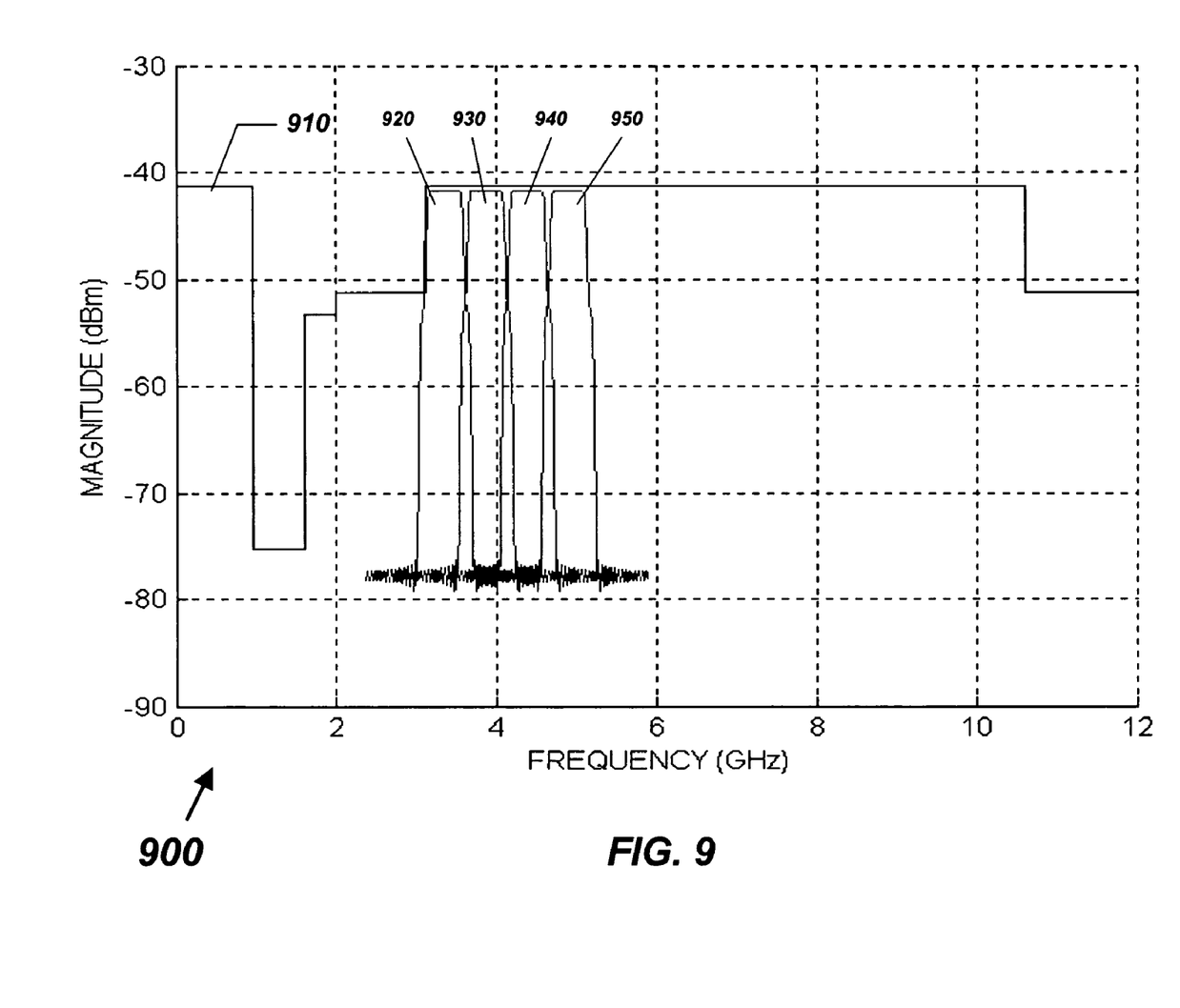
FIG. 9 is a frequency spectrum output of the multiband UWB communication system according to one embodiment.

FIG. 9 is an output UWB frequency spectrum 900 of a multimode and multiband MIMO transceiver of W-CDMA, WLAN and UWB communication transmitter, including four multi-frequency band spectrums of 920, 930, 940 and 950 according to some embodiments. A FCC emission limitation 910 for UWB operation is also shown in FIG. 9. Each transmitter frequency bandwidth of all the multi-frequency band spectrums of 920, 930, 940 and 950 is 512 MHz and is fitted under the FCC emission limitation 910 with different carrier frequencies. The detail positions of each transmitter multi-frequency band spectrums (dBm) along with the center, lower and upper frequencies (GHz) as well as the channel frequency bandwidth (MHz) are listed in Table 1:

TABLE 1

| Multichannel Label | Center Frequency (GHz) | Lower Frequency (GHz) | Upper Frequency (GHz) | Frequency Bandwidth (MHz) |
|---|---|---|---|---|
| 920 | 3.357 | 3.101 | 3.613 | 512 |
| 930 | 3.869 | 3.613 | 4.125 | 512 |
| 940 | 4.381 | 4.125 | 4.637 | 512 |
| 950 | 4.893 | 4.637 | 5.149 | 512 |

Implementation Flowchart in the Receiver

Figure 10:
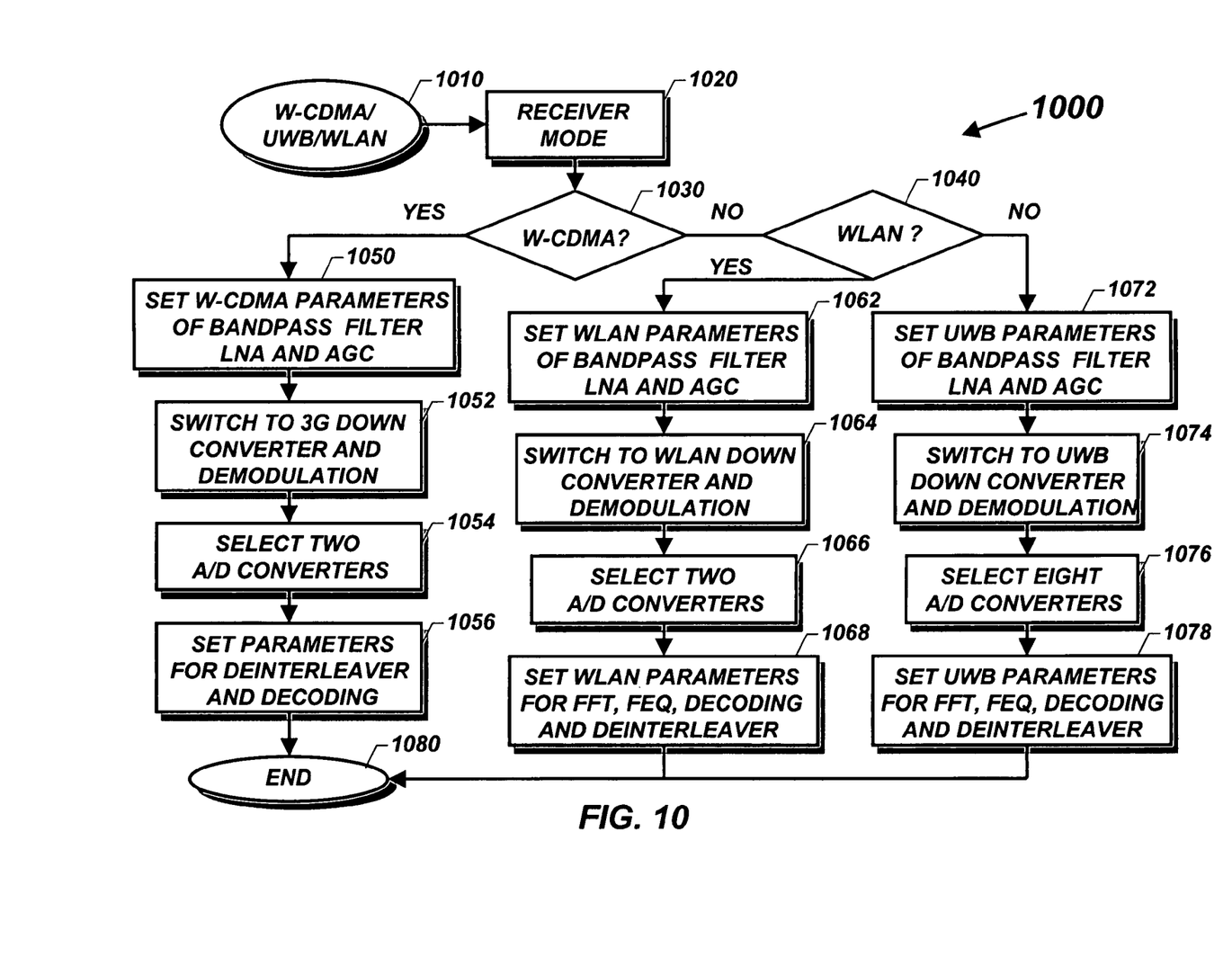
FIG. 10 is a block diagram of showing an implementation flowchart for multimode and multiband MIMO transceiver of W-CDMA, WLAN, and UWB communication according to some embodiments.

FIG. 10 is a block diagram 1000 of showing an implementation flowchart for a multimode and multiband MIMO receiver of W-CDMA, WLAN and UWB communications according to some embodiments. In a receive mode 1020, the output of the receiver mode 1020 passes through a W-CDMA 1030 to determine whether a received signal is W-CDMA, WLAN or UWB. If the received signal is W-CDMA, the multimode and multiband MIMO receiver is then to complete the following steps: 1) set W-CDMA parameters of bandpass filter, LNA and AGC 1050; 2) switch to W-CDMA down converter and demodulation 1052; 3) select two A/D converters 1054 for W-CDMA signals; 4) set W-CDMA parameters for deinterleaver and decoding 1056. If the received signal is WLAN, then, the multimode and multiband MIMO receiver is to accomplish the following steps: 1) set WLAN parameters of bandpass filter, LNA and AGC 1062; 2) switch to WLAN down converter and demodulation 1064; 3) select two A/D converters for WLAN signals; and 4) set WLAN parameters for FFT, FEQ, deinterleaver and decoding 1068. If the received signal is UWB, then, the multimode and multiband MIMO receiver is to finish the following steps: 1) set UWB parameters of bandpass filter, LNA and AGC 1072; 2) switch to UWB down converter and demodulation 1074; 3) select eight A/D converters 1076 for UWB signals; 4) set UWB parameters for FFT, FEQ, deinterleaver and decoding 1078.

While the present inventions have been described with respect to a limited number of embodiments, those skilled in the art will appreciate numerous modifications and variations therefrom. It is intended that the appended claims cover all such modifications and variations as fall within the true spirit and scope of these present inventions.

What is claimed is:

1. A multimode and multiband MIMO transceiver of W-CDMA, WLAN, and UWB communication comprising:
   a MIMO-based multimode and multiband RF unit including W-CDMA, WLAN and UWB connected to a multiple antenna unit in which includes N antennas, where N is an integer and greater than 1;
   said MIMO-based multimode and multiband RF unit connected to a WLAN and UWB OFDM processor in which coupled to a sharing memory bank, an interleaver, and a W-CDMA, WLAN, and UWB control processor coupled to a coding processor;
   said MIMO-based multimode and multiband RF unit connected to a W-CDMA Rake and baseband processor in which coupled to the sharing memory bank, the interleaver, and the W-CDMA, WLAN, and UWB control processor;
   said MIMO-based multimode and multiband RF unit connected to the sharing memory bank in which coupled to the WLAN and UWB OFDM processor, the W-CDMA Rake and baseband processor, and the W-CDMA, WLAN, and UWB control processor;
   said MIMO-based multimode and multiband RF unit connected to the W-CDMA, WLAN, and UWB control processor in which coupled to the sharing memory bank, the W-CDMA Rake and baseband processor, the WLAN and UWB OFDM processor, the interleaver, and the coding processor;
   the interleaver coupled to the W-CDMA, WLAN, and UWB control processor, the W-CDMA Rake and baseband processor, the WLAN and UWB OFDM processor, and the coding processor; and
   the coding processor coupled to the interleaver and the W-CDMA, WLAN, and UWB control processor.

2. The multimode and multiband MIMO transceiver of W-CDMA, WLAN, and UWB communication of claim 1, wherein the W-CDMA rake and baseband processor further comprises two digital receiver filters coupled to two down samplings, a MUX, two spreaders, a despreader sequence generator, a rake receiver unit, and a descrambler coder generator.

3. The multimode and multiband MIMO transceiver of W-CDMA, WLAN, and UWB communication of claim 2, wherein said two digital receiver filters coupled to two down samplings are equivalent to two decimation filters in which have linear phases and symmetric filter coefficients in programmable.

4. The multimode and multiband MIMO transceiver of W-CDMA, WLAN, and UWB communication of claim 1, wherein the MIMO-based multimode and multiband RF unit further comprises N analog bandpass filters, N LNA, N AGC, a sum over block, a selection switch, a W-CDMA down converter and demodulation, a WLAN down converter and demodulation, a multiband UWB down converter and demodulation, and a tri-mode A/D converter unit, where N is an integer and greater than 1.

5. The multimode and multiband MIMO transceiver of W-CDMA, WLAN, and UWB communication of claim 4, wherein the tri-mode A/D converter unit further comprises:
   two selection switches with three inputs and one output;
   each of said two selection switches connects one input of W-CDMA, WLAN or UWB signals;
   eight M A/D converters with uniform sampling rate and resolution, where M is a integer and greater than 1;
   two of said M A/D converters for W-CDMA mode or WLAN mode; and
   said M A/D converters for UWB mode.

6. The multimode and multiband MIMO transceiver of W-CDMA, WLAN, and UWB communication of claim 1, wherein the WLAN and UWB OFDM processor further comprises:
   a WLAN digital decimation channel select filter unit;
   a controllable selection switch with connecting either a WLAN input or an UWB input and producing a serial output;
   a dual-mode WLAN and UWB serial-to-parallel (S/P) and guard removing;
   a dual-mode WLAN and UWB FFT and frequency-domain equalizer (FEQ);
   a dual-mode parallel-to-serial (P/S) with either M inputs or N inputs in parallel and one serial output, where M and N are an integer and greater than 1;
   a multiband UWB digital receiver filter, despreading and time-domain equalizer (TEQ) unit;
   Q S/P and guard removing, where Q is an integer and greater than 1;
   Q FFT and FEQ;
   Q P/S with N inputs in parallel and one serial output, where N is an integer and greater than 1;
   a P/S with P inputs in parallel and one serial output, where O is an integer and greater than 1;
   a spreader; and
   a user key sequence generator.

7. The multimode and multiband MIMO transceiver of W-CDMA, WLAN, and UWB communication of claim 6, wherein the dual-mode WLAN and UWB FFT and FEQ further comprises a dual-mode FFT, N equalizers, N decision detectors, N subtracts, an adaptive algorithm, and a WLAN/UWB mode generator, where N is an integer and greater than 1.

8. The multimode and multiband MIMO transceiver of W-CDMA, WLAN, and UWB communication of claim 7, wherein said dual-mode FFT has either 2N inputs and N outputs in parallel for UWB operation or M inputs and M outputs in parallel for WLAN operation, where N and M are integers and greater than 1.

9. The multimode and multiband MIMO transceiver of W-CDMA, WLAN, and UWB communication of claim 7, wherein said dual-mode WLAN and UWB FFT and FEQ uses the dual-mode FFT with M inputs and M outputs in parallel, M equalizers, M decision detectors, M subtracts, and the adaptive algorithm during WLAN operation, where M is an integer and greater than 1.

10. The multimode and multiband MIMO transceiver of W-CDMA, WLAN, and UWB communication of claim 7, wherein said adaptive algorithm is a least mean square (LMS), a recursive least squares (RLS) or a constant modulus algorithm (CMA).

11. The multimode and multiband MIMO transceiver of W-CDMA, WLAN, and UWB communication of claim 6, wherein the multiband UWB digital receiver filter, despreading and TEQ unit further comprises N signal processing branches in parallel, each of said signal processing branches including two digital receiver filters coupled to two spreaders, which are used to despread input signals with two sequences from a multiband despreading generator, and the outputs of said two spreaders are multiplied by a MUX followed by a TEQ, where N is an integer and greater than 1.

12. A multimode and multiband MIMO-based W-CDMA, WLAN, and UWB communication receiver comprising:
   four antennas coupled to a multimode and multiband W-CDMA, WLAN and UWB RF unit;
   the multimode and multiband W-CDMA, WLAN and UWB RF unit coupled to a W-CDMA rake and baseband processor, a dual-mode WLAN and UWB OFDM processor, a sharing memory bank, and a tri-mode control processor of W-CDMA, WLAN and UWB;
   said W-CDMA rake and baseband processor, said dual-mode WLAN and UWB OFDM processor, said sharing memory bank, and said tri-mode control processor of W-CDMA, WLAN and UWB coupled to a tri-mode interleaver; and
   the tri-mode interleaver coupled to a coding processor in which is controlled by said tri-mode control processor of W-CDMA, WLAN and UWB.

13. The multimode and multiband MIMO-based W-CDMA, WLAN, and UWB communication receiver of claim 12, wherein the multimode and multiband W-CDMA, WLAN and UWB RF unit further comprises:
   four analog signal processing branches, each of said analog signal processing branches including an analog bandpass filter coupled to a LNA followed by a AGC, which are summed by a sum over a block followed by a selection switch;
   said selection switch connects to a W-CDMA down converter and demodulation during a W-CDMA mode or to a WLAN down converter and demodulation during a WLAN mode or to an UWB down converter and demodulation during UWB mode; and
   said W-CDMA down converter and demodulation, said WLAN down converter and demodulation, and said UWB down converter and demodulation in parallel coupled to a tri-mode A/D converter unit.

14. The multimode and multiband MIMO-based W-CDMA, WLAN, and UWB communication receiver of claim 13, wherein said each of said analog signal processing branches, including analog bandpass filter coupled to a LNA followed by a AGC is programmable in parameters and has scalability functions.

15. The multimode and multiband MIMO-based W-CDMA, WLAN, and UWB communication receiver of claim 12, wherein the dual-mode WLAN and UWB OFDM processor further comprises:
   a WLAN digital decimation channel select filter unit coupled to a selection switch followed by a WLAN signal processing branch including a dual-mode WLAN and UWB S/P and guard removing, a dual-mode WLAN and UWB FFT and FEQ, and a dual-mode P/S;
   said dual-mode P/S having either 64 inputs and an output or 512 inputs and an output;
   a multiband UWB digital receiver filter, despreading and TEQ unit coupled to said WLAN signal processing branch and three UWB signal processing branches that are combined by a P/S followed by a spreader supported by an user-p key generator; and
   each of the said UWB signal processing branches including a S/P and guard removing coupled to a FFT and FEQ followed by a P/S.

16. An article comprising a medium storing instructions adapted to be executed to perform a method that causes a processor-based system to:
   set the processor-based system in a receiver mode depending on whether received signals belong to W-CDMA, WLAN or UWB; and
   set the processor-based system to perform a W-CDMA function and to turn off WLAN and UWB functions during W-CDMA mode;
   set the processor-based system to perform the WLAN function and to turn off the W-CDMA and the UWB functions during WLAN mode; or
   set the processor-based system to perform the UWB function and to turn off the W-CDMA and the WLAN functions during UWB mode.

17. The article of claim 16 further storing instructions that cause a processor-based system during a W-CDMA mode to:
   set W-CDMA parameters for bandpass filters, LNA and AGC;
   control a switch to connect with a W-CDMA down converter and demodulation;
   select two A/D converters out of eight A/D converters for W-CDMA signals; and
   set W-CDMA parameters for a tri-mode interleaver and a tri-mode decoding.

18. The article of claim 16 further storing instructions that cause a processor-based system during a WLAN mode to:
   set WLAN parameters for bandpass filters, LNA and AGC;
   control a switch to connect with a WLAN down converter and demodulation;
   select two A/D converters for WLAN signals; and
   set WLAN parameters for a FFT and FEQ, the tri-mode interleaver and the tri-mode decoding.

19. The article of claim 16 further storing instructions that cause a processor-based system during an UWB mode to:
   set UWB parameters for bandpass filters, LNA and AGC;
   control a switch to connect with a UWB down converter and demodulation;
   select eight A/D converters for UWB signals; and
   set UWB parameters for a FFT and FEQ, an tri-mode interleaver and a tri-mode decoding.

* * * * *